US011165280B2

(12) United States Patent
Nakamura et al.

(10) Patent No.: US 11,165,280 B2
(45) Date of Patent: Nov. 2, 2021

(54) POWER MANAGEMENT METHOD, POWER MANAGEMENT APPARATUS, POWER CONVERSION APPARATUS, AND POWER MANAGEMENT SYSTEM

(71) Applicant: KYOCERA Corporation, Kyoto (JP)

(72) Inventors: Kazutaka Nakamura, Yokohama (JP); Kentaro Kamei, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 6 days.

(21) Appl. No.: 16/336,896

(22) PCT Filed: Sep. 27, 2017

(86) PCT No.: PCT/JP2017/034902
§ 371 (c)(1),
(2) Date: Mar. 26, 2019

(87) PCT Pub. No.: WO2018/062247
PCT Pub. Date: Apr. 5, 2018

(65) Prior Publication Data
US 2020/0036226 A1    Jan. 30, 2020

(30) Foreign Application Priority Data

Sep. 27, 2016    (JP) .............................. JP2016-188856

(51) Int. Cl.
*H02J 13/00* (2006.01)
*G05B 15/02* (2006.01)
(Continued)

(52) U.S. Cl.
CPC .......... *H02J 13/0096* (2013.01); *G05B 15/02* (2013.01); *H02J 3/32* (2013.01); *H02J 3/381* (2013.01)

(58) Field of Classification Search
CPC .......... H02J 13/0096; H02J 3/32; H02J 3/381; H02J 13/00034; H02J 13/00004;
(Continued)

(56) References Cited

U.S. PATENT DOCUMENTS 9,774,711 B2    9/2017    Miyake et al.
9,979,347 B2 *  5/2018    Satake ................... H02S 40/32
(Continued)

FOREIGN PATENT DOCUMENTS

EP    2882072 A1    6/2015
EP    2882073 A1    6/2015
(Continued)

*Primary Examiner* — Thomas C Lee
*Assistant Examiner* — Charles Cai
(74) *Attorney, Agent, or Firm* — Hauptman Ham, LLP

(57) ABSTRACT

A power management method includes step A of performing communication of a predetermined command using a predetermined protocol between a power conversion apparatus and a power management apparatus. The power conversion apparatus is connected to first and second distributed power sources. The method further includes step B of converting, by the power conversion apparatus, DC power from the first and second distributed power sources into AC power. The step A includes a step of performing, in a manner capable of identifying a connection rated output of the power conversion apparatus in a grid connection state and a self-sustained rated output of the power conversion apparatus in a self-sustained operation state, communication of a command including an information element designating at least one of the connection rated output of the power conversion apparatus and the self-sustained rated output of the power conversion apparatus, as the communication of the predetermined command.

15 Claims, 6 Drawing Sheets

(51) Int. Cl.
*H02J 3/32* (2006.01)
*H02J 3/38* (2006.01)

(58) Field of Classification Search
CPC .............. H02J 2310/12; H02J 2300/40; H02J 2300/24; H02J 2300/30; H02J 13/00032; G05B 15/02; Y02E 10/56
See application file for complete search history.

(56) References Cited

U.S. PATENT DOCUMENTS

| | | | |
|---|---|---|---|
| 10,270,256 B2 | 4/2019 | Okino et al. | |
| 10,418,821 B2* | 9/2019 | Satake | H02M 7/42 |
| 2011/0264289 A1* | 10/2011 | Sawyer | H02J 3/381 |
| | | | 700/287 |
| 2015/0015179 A1* | 1/2015 | Yamada | H01M 10/44 |
| | | | 320/101 |
| 2015/0229268 A1* | 8/2015 | Satake | H02S 50/10 |
| | | | 136/244 |
| 2015/0293510 A1* | 10/2015 | Satake | H04L 12/2818 |
| | | | 700/296 |
| 2016/0064936 A1* | 3/2016 | Satake | H02J 7/35 |
| | | | 307/20 |
| 2018/0041039 A1* | 2/2018 | Satake | H02J 7/35 |
| 2018/0041042 A1* | 2/2018 | Maki | H02J 3/381 |
| 2018/0041824 A1 | 2/2018 | Kakuda | |
| 2018/0048160 A1* | 2/2018 | Narla | H02J 5/00 |
| 2018/0248376 A1* | 8/2018 | Teramoto | H02J 7/00 |
| 2018/0248514 A1* | 8/2018 | Satake | H02S 40/34 |

FOREIGN PATENT DOCUMENTS

| | | |
|---|---|---|
| EP | 3021446 A1 | 5/2016 |
| JP | 2010-128810 A | 6/2010 |
| JP | 2014-33593 A | 2/2014 |
| JP | 2014-212655 A | 11/2014 |
| WO | 2014051039 A1 | 4/2014 |
| WO | 2015093494 A1 | 6/2015 |
| WO | 2016136912 A1 | 9/2016 |

\* cited by examiner

POWER MANAGEMENT METHOD, POWER MANAGEMENT APPARATUS, POWER CONVERSION APPARATUS, AND POWER MANAGEMENT SYSTEM

RELATED APPLICATIONS

The present application is a National Phase of International Application No. PCT/JP2017/034902, filed Sep. 27, 2017, and claims priority based on Japanese Patent Application No. 2016-188856, filed Sep. 27, 2016.

TECHNICAL FIELD

The present invention relates to a technique relating to a power management method, a power management apparatus, a power conversion apparatus, and a power management system.

BACKGROUND ART

In recent years, techniques for adjusting the power supply and demand balance of the power grid by using a distributed power source installed in facilities have gained attention. Such a distributed power source includes for example, a power source that use natural energy (a photovoltaic power generation apparatus, a wind power generation apparatus, and a hydroelectric power generation apparatus).

In addition, a power management system including equipment and a power management apparatus that manages the equipment has been proposed. According to the object to be managed, the power management system is referred to as, for example, an HEMS (Home Energy Management System), an SEMS (Store Energy Management System), a BEMS (Building Energy Management System), an FEMS (Factory Energy Management System), and a CEMS (Cluster/Community Energy Management System).

It is effective to share the communication standard between the equipment and the power management apparatus to disseminate the power management system described above, and commonization of such communication standards has been attempted.

CITATION LIST

Patent Literature
[Patent Literature 1] Japanese application publication No. 2010-128810

SUMMARY OF INVENTION

Commonization of the message format described above has just begun, and various studies on the message format to properly control the equipment are necessary to conduct.

Accordingly, the present invention has been made to solve the above-described problems, and it is an object of the present invention to provide a power management method, a power management apparatus, a power conversion apparatus, and a power management system that make it possible to appropriately control an equipment.

A power management method according to a first disclosure comprises a step A of performing communication of a predetermined command using a predetermined protocol between a power conversion apparatus and a power management apparatus. The power conversion apparatus is connected to a first distributed power source and a second distributed power source. The power management method comprises a step B of converting, by the power conversion apparatus, DC power from the first distributed power source and the second distributed power source into AC power. The step A includes a step of performing, in a manner capable of identifying a connection rated output of the power conversion apparatus in a grid connection state and a self-sustained rated output of the power conversion apparatus in a self-sustained operation state, communication of a command including an information element designating at least one of the connection rated output of the power conversion apparatus and the self-sustained rated output of the power conversion apparatus, as the communication of the predetermined command.

A power conversion apparatus according to a second disclosure is connected to a first distributed power source and a second distributed power source. The power conversion apparatus comprises a power conversion unit configured to convert DC power from the first distributed power source and the second distributed power source into AC power; and a communication unit configured to perform communication of a predetermined command using a predetermined protocol with a power management apparatus. The communication unit is configured to perform, in an manner capable of identifying a connection rated output of the power conversion apparatus in a grid connection state and a self-sustained rated output of the power conversion apparatus in a self-sustained operation state, communication of a command including an information element designating at least one of the connection rated output of the power conversion apparatus and the self-sustained rated output of the power conversion apparatus, as communication of the predetermined command.

A power management apparatus according to a third disclosure comprises a communication unit configured to perform communication of a predetermined command using a predetermined protocol with a power conversion apparatus. The power conversion apparatus is connected to a first distributed power source and a second distributed power source. The power conversion apparatus converts DC power from the first distributed power source and the second distributed power source into AC power. The communication unit is configured to perform, in an manner capable of identifying a connection rated output of the power conversion apparatus in a grid connection state and a self-sustained rated output of the power conversion apparatus in a self-sustained operation state, communication of a command including an information element designating at least one of the connection rated output of the power conversion apparatus and the self-sustained rated output of the power conversion apparatus, as the communication of the predetermined command.

A power management system according to a fourth disclosure comprises a power conversion apparatus connected to a first distributed power source and a second distributed power source; and a power management apparatus. The power conversion apparatus comprises: a power conversion unit configured to convert DC power from the first distributed power source and the second distributed power source into AC power, and a first communication unit configured to perform communication of a predetermined command using a predetermined protocol with the power management apparatus. The power management apparatus comprises: a second communication unit configured to perform communication of the predetermined command using the predetermined protocol with the power conversion apparatus. The first communication unit and the second communication unit are configured to perform, in an manner capable of identifying a connection rated output of the power conversion apparatus in a grid connection state and a self-sustained rated output of the power conversion apparatus in an self-sustained operation state, communication of a command including an information element designating at least one of the connection rated output of the power conversion apparatus and the self-sustained rated output of the power conversion apparatus, as the communication of the predetermined command.

According to one aspect, it is possible to provide a power management method, a power management apparatus, a power conversion apparatus, and a power management system that make it possible to appropriately control an equipment.

DESCRIPTION OF EMBODIMENTS (Power Management System)

In the following, a power management system according to an embodiment will be described.

Figure 1:
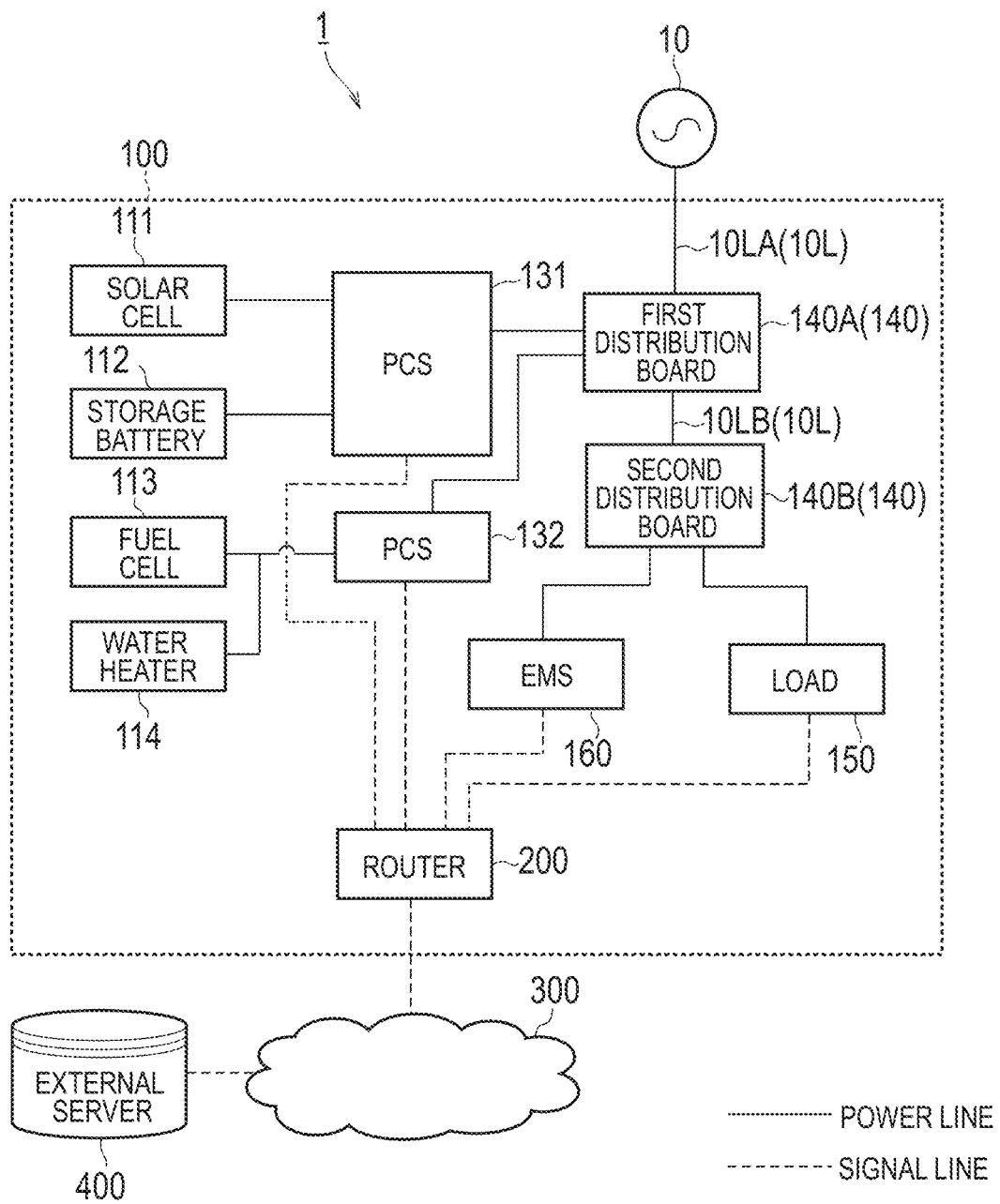
FIG. 1 is a diagram showing a power management system 1 according to an embodiment.

As shown in FIG. 1, a power management system 1 according to an embodiment includes a facility 100, and an external server 400. The facility 100 has a router 200. The router 200 is connected to the external server 400 via a network 300. The router 200 constitutes a local area network, and is connected to each unit (for example, the PCS 131, the PCS 132, a load 150, the EMS 160, etc.). In FIG. 1, the solid line indicates the power line, the dotted line indicates the signal line. The signal may be transmitted via the power line.

The facility 100 includes a solar cell 111, a storage battery 112, a fuel cell 113, a water heater 114, the PCS 131, the PCS 132, a distribution board 140, the load 150, and the EMS 160.

The solar cell 111 generates electric power in response to light reception. The solar cell 111 outputs the generated DC power. The amount of power generation of the solar cell 111 changes in accordance with the amount of solar radiation applied to the solar cell 111. In an embodiment, the solar cell 111 is an example of a first distributed power source connected to the PCS 131.

The storage battery 112 accumulates power. The storage battery 112 outputs the accumulated DC power. In an embodiment, the storage battery 112 is an example of a second distributed power source connected to the PCS 131.

The fuel cell 113 generates power using the fuel gas. The fuel cell 113 may be any one of a solid oxide fuel cell (hereinafter referred to as an SOFC), a polymer electrolyte fuel cell (hereinafter referred to as a PEFC), a phosphoric acid fuel cell (hereinafter referred to as a PAFC), and a molten carbonate fuel cell (hereinafter referred to as an MCFC).

The water heater 114 has a hot water tank. The water heater 114 uses exhaust heat discharged from the fuel cell 113, and maintains or increases the amount of water or hot water stored in the hot water tank. The water heater 114 may maintain or raise the temperature of the water or hot water stored in the hot water tank. Such control may be referred to as boiling up of the water stored in the hot water tank. In such a case, a unit including the fuel cell 113 and the water heater 114 may be referred to as a fuel cell apparatus.

The PCS 131 is a power conversion apparatus (PCS) connected to the solar cell 111 and the storage battery 112. The PCS 131 converts DC power from the solar cell 111 and the storage battery 112 into AC power. The PCS 131 converts AC power to the storage battery 112 into DC power.

The PCS 132 is a power conversion apparatus connected to the fuel cell 113. The PCS 132 converts DC power from the fuel cell 113 into AC power.

In an embodiment, the PCS 131 and the PCS 132 are connected to the router 200 by wire or radio. The PCS 131 and the PCS 132 may be connected to the external server 400 via the router 200. The PCS 131 and the PCS 132 are connected to the EMS 160 via the router 200, and performs communication of a predetermined command having a predetermined format with the EMS 160. The predetermined format is not particularly limited. For example, the predetermined format conforms to the ECHONET method, the ECHONET Lite method, the SEP 2.0 method, the KNX method, or the like.

For example, as an example of a predetermined format, the format conforming to the ECHONET Lite method will be described. In such a case, the predetermined command includes any one of, for example, a setting command (for example, a SET command) instructing setting or operation of the equipment to each equipment, a setting response command (for example, a SET response command) which is a response to the setting command, a request command (for example, a GET command) for requesting each equipment to transmit equipment information, a request response command (for example, a GET response command) which is a response to the request command, and an information notification command (for example, an INF command) making autonomously notification of the equipment information from each equipment.

The distribution board 140 is connected to a main power line 10L. The distribution board 140 has a first distribution board 140A and a second distribution board 140B. The main power line 10L has a main power line 10LA and a main power line 10LB. The first distribution board 140A is connected to a power grid 10 via the main power line 10LA. The first distribution board 140A is connected to the solar cell 111 and the storage battery 112 via the PCS 131, and is connected to the fuel cell 113 via the PCS 132. The first distribution board 140A supplies, to the second distribution board 140B, the power output from the PCS 131 or the PCS 132 to the first distribution board 140A and the power supplied from the power grid 10 to the first distribution board 140A through the main power line 10LB. The second distribution board 140B distributes the power supplied via the main power line 10LB to each equipment such as the load 150 and the EMS 160.

The load 150 consumes the power supplied via the power line. For example, the load 150 includes an air conditioner, a lighting apparatus, a refrigerator, a television, and the like. The load 150 may be a single apparatus, or may include a plurality of apparatuses.

The EMS 160 is a power management apparatus (EMS: Energy Management System) that manages power information indicating the power at the facility 100. The power at the facility 100 is, for example, the power flowing in the facility 100, the power purchased by the facility 100, or the power sold by the facility 100. Accordingly, the EMS 160 manages at least one of the PCS 131 and the PCS 132.

The EMS 160 may control at least one of the amount of power generation of the solar cell 111, the amount of charge of the storage battery 112, the amount of discharge of the storage battery 112, and the amount of power generation of the fuel cell 113. The EMS 160 may be integral with the distribution board 140. The EMS 160 is a apparatus connected to the network 300. The functions of the EMS 160 may be provided by a cloud service via the network 300.

In an embodiment, the EMS 160 is connected to each equipment (for example, a communication apparatus 132 of the PCS 130 and the load 150) via the router 200. The EMS 160 performs communication of a predetermined command having a predetermined format with each equipment.

The network 300 is a communication network connecting the EMS 160 and the external server 400. The network 300 may be a public communication line such as the Internet. The network 300 may include a mobile communication network. Further, the network 300 may be a dedicated communication line, or may be a general communication line.

The external server 400 is a server of a business entity such as a power generation company, a transmission and distribution company, a retailer, or a management company of a group of distributed power sources. From the viewpoint of stabilization of the power grid 10 and the like, the external server 400 transmits a power instruction message.

The power instruction message is one of a power flow amount control message (DR; Demand Response) instructing the control of the amount of flow to the facility 100 from the power grid 10, a reverse power flow control message instructing control of the amount of backward flow to the power grid 10 from the facility 100, and a power control message instructing control of the distributed power source provided in the facility 100. The power control message may not be accompanied by control of the flow amount or backward flow amount.

The power instruction message includes, for example, a target control level of the distributed power source. The target control level is determined according to the equipment certification output. The equipment certification output is an output certified as the output capability of the PCS controlling the distributed power source, for example, the rated output. The target control level may be represented by an absolute value (for example, ∘∘ kW) determined according to the equipment certification output, may be represented as a relative value (for example, a decrease of ∘∘ kW) with respect to the equipment certification output, or may be represented by a control ratio (for example, ∘∘ %) with respect to the equipment certification output. The target control level may be determined according to the equipment certification capacity [kWh].

When the output capability of the distributed power source is different from the output capability of the PCS, equipment certification output is set based on the smaller output capability among these output capabilities. In the case where a plurality of PCSs is installed, the equipment certification output may be the sum of the output capabilities of the plurality of PCSs.

The power instruction message may include calendar information indicating a schedule of control of the distributed power source. In the calendar information, the schedule of control of the distributed power source can be set, for example, in a unit of 30 minutes, but is not limited to this. Any time width may be set as one unit. The calendar information may include a schedule for one day, may include a schedule for one month, or may include a schedule for one year.

The predetermined period may be defined as the maximum period during which the distributed power source is controlled. The predetermined period may be, for example, the number of days in one year (the number of days rule), or may be the cumulative hours in one year (cumulative hour rule). In particular, the predetermined period may be, for example, 30 days in one year (30 day rule) and 360 hours in one year (360 hour rule). The predetermined period may not be defined (designated rule).

In an embodiment, the external server 400 may transmit a power instruction message to the EMS 160. The EMS 160 may transmit a predetermined command based on the power instruction message to at least one of the PCS 131 and the PCS 132. The external server 400 may directly transmit a power instruction message to at least one of the PCS 131 and the PCS 132 without via the EMS 160.

(Power Conversion Apparatus)

Figure 2:
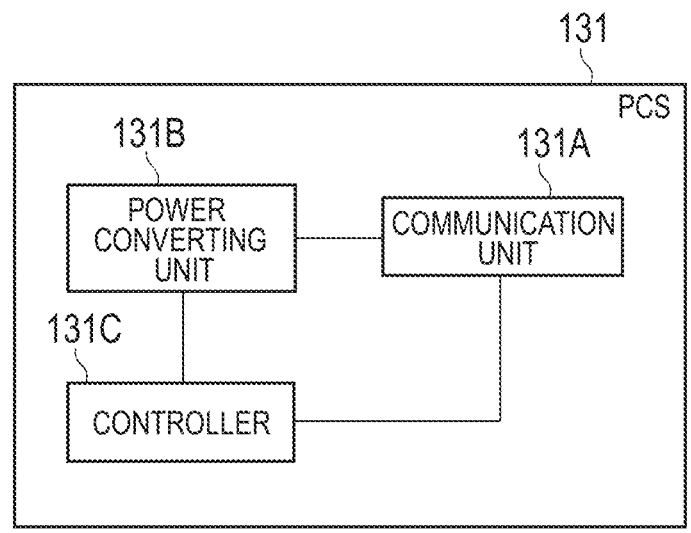
FIG. 2 is a diagram showing a PCS 131 according to an embodiment.

In the following, the power conversion apparatus according to an embodiment will be described. Here, the PCS 131 is exemplified as a power conversion apparatus. As shown in FIG. 2, the PCS 131 includes a communication unit 131A, a power conditioning unit 131B, and a controller 131C.

The communication unit 131A includes a communication module and the like. The communication unit 131A performs communication of a predetermined command using a predetermined protocol with the EMS 160. The communication unit 131A may be referred to as a first communication unit that performs communication of a predetermined command using the predetermined protocol with the EMS 160.

The power conditioning unit 131B converts DC power from the solar cell 111 and the storage battery 112 into AC power. The power conditioning unit 131B converts AC power to the storage battery 112 into DC power.

The controller 131C includes a CPU, a memory, and the like. The controller 131C controls the communication unit 131A and the power conditioning unit 131B. For example, the controller 131C controls the power conditioning unit 131B based on a predetermined command received from the EMS 160. That is, the controller 131C controls at least one of the amount of power generation of the solar cell 111, the amount of charge of the storage battery 112, and the amount of discharge of the storage battery 112 according to the instruction of the EMS 160.

(Power Management Apparatus)

Figure 3:
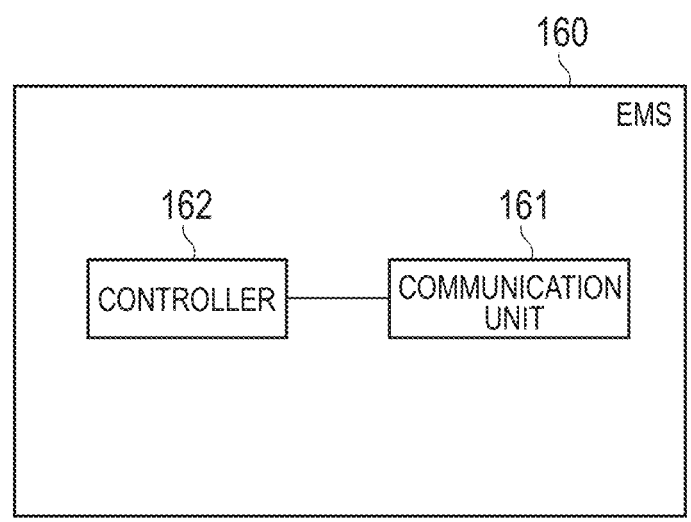
FIG. 3 is a diagram showing an EMS 160 according to an embodiment.

In the following, the power management apparatus according to an embodiment will be described. Here, the EMS 160 is exemplified as a power management apparatus. As shown in FIG. 3, the EMS 160 includes a communication unit 161, and a controller 162.

The communication unit 161 includes a communication module and the like. The communication unit 161 performs communication of a predetermined command using a predetermined protocol with the PCS 131 or the PCS 132. The communication unit 161 may be referred to as a second communication unit that performs communication of a predetermined command using a predetermined protocol with the PCS 131 or the PCS 132.

The controller 162 includes a CPU, a memory, and the like. The controller 162 controls the communication unit 161. For example, the controller 162 collects information from each equipment (PCS 131, PCS 132, load 150) in order to manage power at the facility 100. The controller 162 controls each equipment such as the PCS 131, the PCS 132, the load 150, and the like based on at least one of the power state and the power instruction message at the facility 100.

(Message format)

In the following, a message format according to an embodiment will be described. Here, a case where the predetermined format is a format conforming to the ECHONET Lite method will be exemplified.

Figure 4:
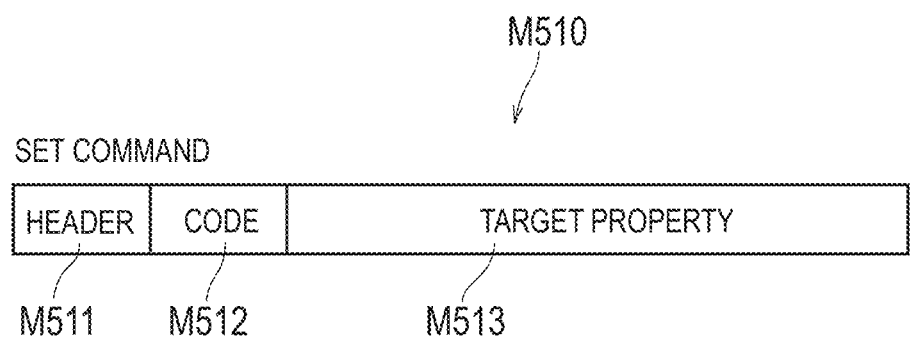
FIG. 4 is a diagram showing an example of a SET command according to an embodiment.

As shown in FIG. 4, the SET command M510 includes a header M511, a code M512, and a target property M513. In an embodiment, the SET command M510 is an example of a setting command instructing setting or operation of the equipment for each equipment, and is a command transmitted from the EMS 160 to the equipment. The header M511 is information indicating a destination etc. of the SET command M510. The code M512 is information indicating the type of the message including the code M512. Here, the code M512 is information indicating that the message including the code M512 is a SET command. The target property M513 includes an information element (property) indicating setting or operation of the equipment instructed by the EMS 160.

Figure 5:
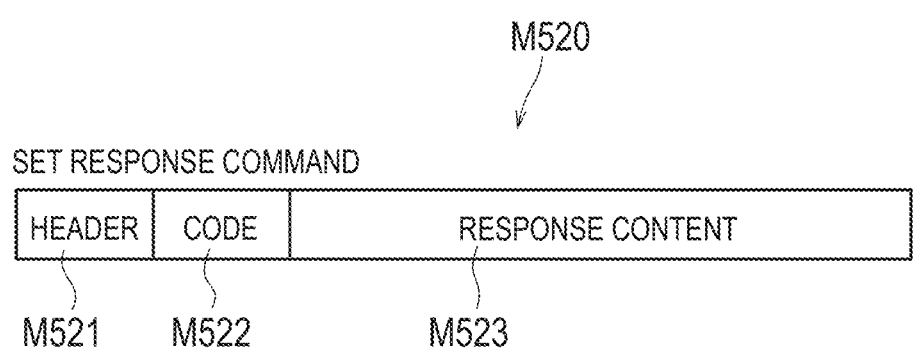
FIG. 5 is a diagram showing an example of a SET response command according to an embodiment.

As shown in FIG. 5, the SET response command M520 includes a header M521, a code M522, and a response content M523. In an embodiment, in response to the command received from the EMS 160, the SET response command M520 an example of a command transmitted from the equipment to the EMS 160.

The header M521 is information indicating the destination etc. of the SET response command M520. The code M522 is information indicating the type of the message including the code M522. Here, the code M522 is information indicating that the message including the code M522 is a SET response command. The response content M523 includes information indicating that the SET command has been received. Such information may be a copy of the property included in the SET command, or may be an acknowledgement (ACK). Such information is not limited to this. It may be a response (Selective ACK) intended to correctly receive only part of the data.

Figure 6:
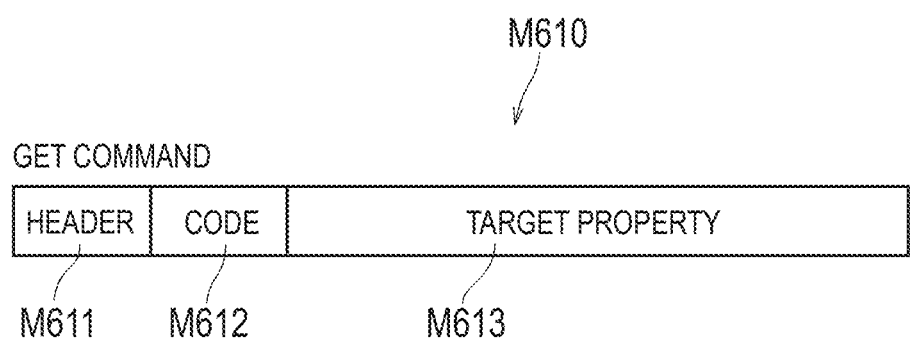
FIG. 6 is a diagram showing an example of a GET command according to an embodiment.

As shown in FIG. 6, the GET command M610 includes a header M611, a code M612 and a target property M613. In an embodiment, the GET command M610 is an example of a request command for requesting each equipment to transmit equipment information, and is an example of a command transmitted from the EMS 160 to the equipment. The header M611 is information indicating the destination etc. of the GET command M610. The code M612 is information indicating the type of the message including the code M612. Here, the code M612 is information indicating that the message including the code M612 is a GET command. The target property M613 includes an information element (property) in which the EMS 160 requests transmission.

Figure 7:
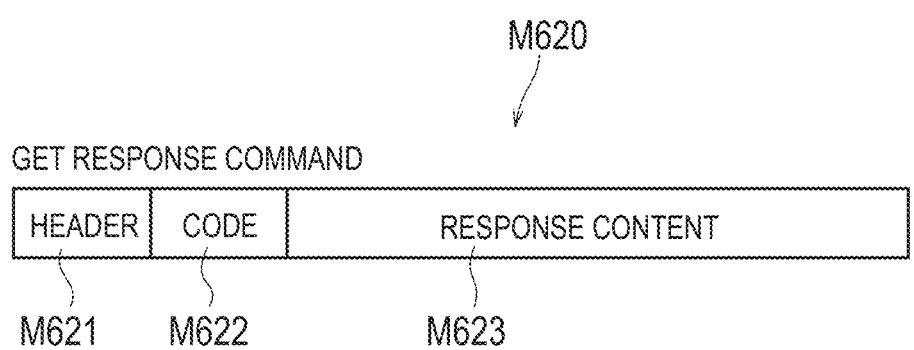
FIG. 7 is a diagram showing an example of a GET response command according to an embodiment.

As shown in FIG. 7, the GET response command M620 includes a header M621, a code M622, and a response content M623. In an embodiment, in response to the command received from the EMS 160, the GET response command M620 is an example of a command transmitted from the equipment to the EMS 160.

The header M621 is information indicating the destination etc. of the GET response command M620. The code M622 is information indicating the type of the message including the code M622. Here, the code M622 is information indicating that the message including the code M622 is a GET response command. The response content M623 includes the information element (property) requested by the GET command.

Figure 8:
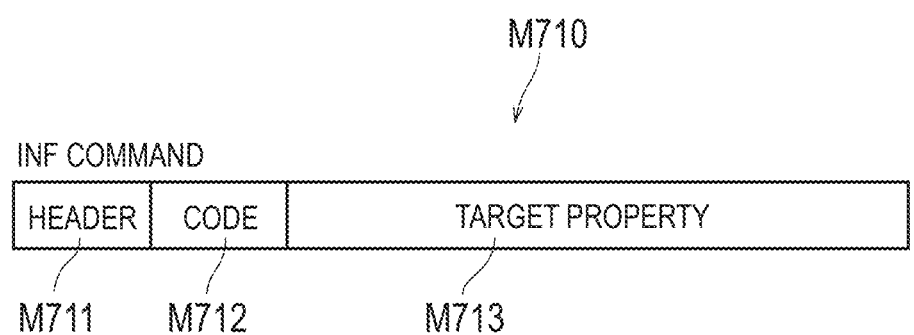
FIG. 8 is a diagram showing an example of an INF command according to an embodiment.

As shown in FIG. 8, the INF command M710 includes a header M711, a code M712, and a target property M713. In an embodiment, the INF command M710 is an example of an information notification command in which each equipment autonomously makes notification of equipment information, and is an example of a command transmitted from each equipment to the EMS 160. The header M711 is information indicating the destination etc. of the INF command M710. The code M712 is information indicating the type of a message including the code M712. Here, the code M712 is information indicating that the message including the code M712 is an INF command. The target property M713 includes an information element (property) of which each equipment autonomously makes notification.

Here, the information elements may be commonly used among the commands. For example, in the case where the information element is the operation state of the equipment, the SET command including the operation state as an information element functions as a command instructing setting of the operation state to each equipment. On the other hand, the GET command including the operation state as the information element functions as a command requesting the transmission of the operation state of the equipment.

Information elements include an information element used only for the SET command (SET response command), an information element used only for the GET command (GET response command), an information element used only for the INF command, a SET command (SET response command), a GET command (GET response command), and an information element used for two or more commands selected from the INF commands.

In an embodiment, the information element includes an information element designating the connection rated output of the PCS 131 in the grid connection state and the self-sustained rated output of the PCS 131 in the self-sustained operation state. The information element may include an information element designating the connection rated output of the solar cell 111 in the grid connection state and the self-sustained rated output of the solar cell 111 in the self-sustained operation state. The information element may include an information element designating the connection rated output of the storage battery 112 in the grid connection state and the self-sustained rated output of the storage battery 112 in the self-sustained operation state.

Here, the rated output of the PCS 131 may be the equipment certification output described above. The rated output of the PCS 131 may be represented by a power value (W), may be represented by a voltage value (V), or may be represented by a current value (A). The rated output of the solar cell 111 may be represented by a power value (W), may be represented by a voltage value (V), or may be represented by a current value (A). The rated output of the storage battery 112 may be represented by a power value (W), may be represented by a voltage value (V), may be represented by a current value (A), or may be represented by a capacitance value (Ah).

In this case, the information element may include an information element indicating a grid connection state or a self-sustained operation state, an information element indicating any equipment (PCS 131, solar cell 111 or storage battery 112), and an information element indicating a rated output. The meaning of information elements included in one command may be expressed by including these three information elements in one command. Alternatively, the information element may include an information element indicating a grid connection state or a self-sustained operation state, and an information element indicating the rated output of any equipment (PCS 131, solar cell 111 or storage battery 112). The meaning of information elements included in one command may be expressed by including these two information elements in one command. For example, the connection rated output of the PCS 131 in the grid connection state may be expressed by three information elements of an information element indicating a connection operation state, an information element indicating the PCS 131 and an information element indicating a rated output. The connection rated output of the PCS 131 in the grid connection state may be expressed by two information elements of an information element indicating the connection operation state and an information element indicating the rated output of the PCS 131. The self-sustained rated output of the PCS 131 in the self-sustained operation state may be expressed by three information elements of an information element indicating the self-sustained operation state, an information element indicating the PCS 131, and an information element indicating the rated output. The self-sustained rated output of the PCS 131 in the self-sustained operation state may be expressed by two information elements of an information element indicating the self-sustained operation state and an information element indicating the rated output of the PCS 131.

In such a case, the EMS 160 (communication unit 161) performs, in an manner capable of identifying the connection rated output of the PCS 131 and the self-sustained rated output of the PCS 131, communication of a command including an information element designating at least one of the connection rated output of the PCS 131 and the self-sustained rated output of the PCS 131 (transmission of a GET command or reception of a GET response command) as communication of a predetermined command.

The manner capable of identifying may be an manner in which the command includes only one of the information element designating the connection rated output of the PCS 131 and the information element designating the self-sustained rated output of the PCS 131. The identifiable manner capable of identifying may be an manner in which even when the command includes both the information element designating the connection rated output of the PCS 131 and the information element designating the self-sustained rated output of the PCS 131, it is possible to distinguish what the two information elements indicate.

The EMS 160 may perform communication of a command including an information element designating the connection rated output of the solar cell 111 as communication of a predetermined command. The EMS 160 may perform a command including both the information element designating the connection rated output of the PCS 131 and the information element designating the connection rated output of the solar cell 111 as communication of a predetermined command.

The EMS 160 may perform communication of a command including the information element designating the self-sustained rated output of the solar cell 111 as communication of a predetermined command. The EMS 160 may perform a command including both the information element designating the self-sustained rated output of the PCS 131 and the information element designating the self-sustained rated output of the solar cell 111 as communication of a predetermined command.

The EMS 160 may perform communication of a command including the information element designating the connection rated output of the storage battery 112 as communication of a predetermined command. The EMS 160 may perform a command including both the information element designating the connection rated output of the PCS 131 and the information element designating the connection rated output of the storage battery 112 as communication of a predetermined command.

The EMS 160 may perform communication of a command including the information element designating the self-sustained rated output of the storage battery 112 as communication of a predetermined command. The EMS 160 may perform a command including both the information element designating the self-sustained rated output of the PCS 131 and the information element designating the self-sustained rated output of the storage battery 112 as communication of a predetermined command.

Here, the self-sustained rated output of the PCS 131 may be smaller than the connection rated output of the PCS 131. The self-sustained rated output of the solar cell 111 may be smaller than the connection rated output of the solar cell 111. The self-sustained rated output of the storage battery 112 may be smaller than the connection rated output of the storage battery 112.

Since the information element designating the rated output is not used for instructing the setting or operation of the equipment, it may be used only for the GET command, it may be used only for the INF command, or it may be used only for both the GET command and the INF command.

In an embodiment, the EMS 160 may transmit, to the PCS 131, a command (for example, GET property map) requesting a list of information elements that the PCS 131 can handle. In response to such a command, the PCS 131 may transmit, to the EMS 160, a command (for example, GET property map response) indicating a list of information elements that the PCS 131 can handle.

In such a case, a command for inquiring about presence or absence of a function of communicating a command including an information element designating at least one of the connection rated output of the PCS 131 and the self-sustained rated output of the PCS 131 is an example of a command (for example, GET property map) requesting a list of information elements that the PCS 131 can handle. The EMS 160 may transmit only a command including information elements that the PCS 131 can handle.

(Power Management Method)

In the following, a power management method according to an embodiment will be described. A case where the predetermined protocol used in the communication between the PCS 131 and the EMS 160 is the ECHONET Lite method is taken as an example.

Figure 9:
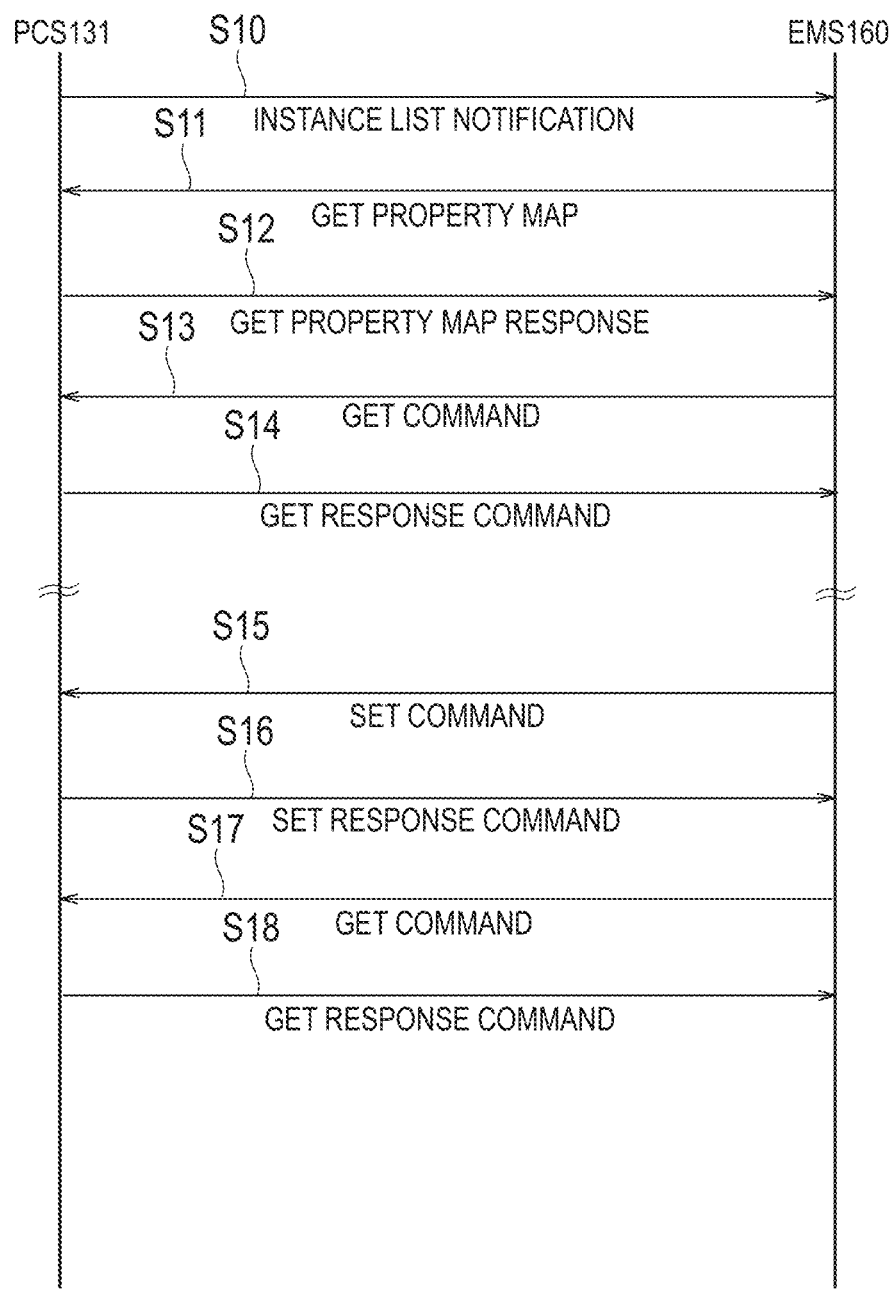
FIG. 9 is a sequence diagram showing a power management method according to an embodiment.

As shown in FIG. 9, in step S10, the PCS 131 transmits the instance list notification to the EMS 160. The instance list notification includes an information element (instance) indicating what kind of equipment the PCS 131 is. The instance may be an information element indicating the type of the PCS 131 alone, or may be an information element indicating the overall type of the solar cell 111, the storage battery 112, and the PCS 131.

The PCS 131 may transmit an instance list notification at the timing when the power of the PCS 131 is turned on or turned on again, the timing when the PCS 131 is connected or reconnected to the local area network, or at the timing when the solar cell 111 or the storage battery 112 is connected or reconnected to the PCS 131.

In step S11, the EMS 160 transmits the GET property map to the PCS 131. The GET property map is a command requesting a list of information elements that the PCS 131 can handle.

In step S12, the PCS 131, in accordance with the GET property map, transmits the GET property map response to the EMS 160. The GET property map response is a command indicating a list of information elements that the PCS 131 can handle.

In step S13, the EMS 160 transmits the GET command to the PCS 131. The GET command is an example of a command including an information element designating at least one of the connection rated output of the PCS 131 and the self-sustained rated output of the PCS 131 in an manner capable of identifying the connection rated output of the PCS 131 and the self-sustained rated output of the PCS 131.

Here, the EMS 160 may transmit as a GET command a command includes an information element designating at least one of the self-sustained rated output of the solar cell 111, the connection rated output of the solar cell 111, the self-sustained rated output of the storage battery 112, and the connection rated output of the storage battery 112.

In step S14, the PCS 131 transmits, in response to the GET command, the GET response command to the EMS 160. The GET response command is an example of a command including an information element designating at least one of the connection rated output of the PCS 131 and the self-sustained rated output of the PCS 131 in an manner capable of identifying the connection rated output of the PCS 131 and the self-sustained rated output of the PCS 131.

Here, the PCS 131 may transmit as a GET response command a command includes an information element designating at least one of the self-sustained rated output of the solar cell 111, the connection rated output of the solar cell 111, the self-sustained rated output of the storage battery 112, and the connection rated output of the storage battery 112.

In step S15, the EMS 160 transmits the SET command to the PCS 131 to control the output of the PCS 131 based on at least one of the state of power and the power instruction message at the facility 100. The SET command includes, for example, the operation state of the PCS 131 as an information element. In such a case, in the grid connection state, the connection rated output of the PCS 131 may be referred to, and in the self-sustained operation state, the self-sustained rated output of the PCS 131 may be referred to.

In step S16, the PCS 131 transmits, in response to the SET command, the SET response command to the EMS 160.

In step S17, the EMS 160 transmits the GET command to the PCS 131 in order to validate whether the PCS 131 is operating in response to the SET command. The GET command includes, for example, the operation state of the PCS 131 as an information element.

In step S18, the PCS 131 transmits, in response to the GET command, the GET response command to the EMS 160.

The process of steps S10 to S14 described above may be an initial setting process or a resetting process. Therefore, the process of step S13 and step S14 described above may be part of the initial setting process or resetting process.

After acquiring the connection rated output and the self-sustained rated output of the PCS 131, the EMS 160 controls, for example, the connection rated output and the self-sustained rated output of the PCS 131 on the storage medium of the inside of the EMS 160. In accordance with whether the state of the grid is connected or self-sustained, the EMS 160 adjusts the output of the PCS 131 controlled by the EMS 160. For example, when in a self-sustained state, the EMS 160 controls the PCS 131 according to the value of the self-sustained rated output.

(Action and Effect)

In an embodiment, the EMS 160 performs, in an manner capable of identifying the connection rated output of the PCS 131 and the self-sustained rated output of the PCS 131, communication of a command including an information element designating at least one of the connection rated output of the PCS 131 and the self-sustained rated output of the PCS 131. Accordingly, the EMS 160 can appropriately control the PCS 131 according to whether the state of the facility 100 (PCS 131) is the grid connection state or the self-sustained operation state. For example, when the value of the self-sustained rated output is set to be smaller than the value of the connection rated output, when the EMS 160 is self-sustaining, the EMS 160 acquires the value of self-sustained rated output to control the PCS 131 based on that value. As a result, activation of protection functions such as overcurrent protection and overload protection is reduced.

Modification 1

In the following, modification 1 will be described. In the following, the differences from the above-described several embodiments will mainly be described.

In an embodiment, the information elements included in each command may be the following information elements.

For example, the information element may be an information element indicating whether the PCS 131 is authenticated by a predetermined protocol. For example, in the ECHONET Lite method, the authentication may be an AIF (Application Interface) authentication.

The information element may be an information element indicating a version of a predetermined protocol receiving the above-described authentication. The version identification information attached when a predetermined protocol is updated.

The information element may be an information element indicating whether the distributed power source can be used for the VPP (Virtual Power Plant). The VPP is a system that uses a distributed power source provided in a plurality of facilities 100 as a power source that supplies power to the power grid 10. In the above-described embodiment, such an information element is an information element indicating at least one of whether the solar cell 111 can be used for the VPP, whether the storage battery 112 can be used for the VPP, and whether the PCS 131 can be used for the VPP. The information element indicating whether it is possible to use for the VPP may be an information element indicating whether the remote operation of a server (for example, the external server 400) provided outside the facility 100 is allowed.

The information element may be an information element designating at least one of the connection output method of the PCS 131 and the self-sustained output method of the PCS 131 in an manner capable of identifying the connection output method of the PCS 131 in the grid connection state and the self-sustained output method of the PCS 131 in the self-sustained operation state. The output method is not particularly limited. The method may be a method of connecting power lines such as single-phase three-wire output or single-phase two-wire output, or may be a method of connecting power lines and an output voltage. The output voltage may be the above rated output.

Other Embodiments

Although the present invention has been described with reference to some embodiments described above, discussion and drawings forming part of this disclosure should not be understood as limiting the present invention. From this disclosure, various alternative embodiments, examples and operational techniques will be apparent to those skilled in the art.

In an embodiment, the cases have been exemplified where information elements indicating the connection rated output of the PCS 131, the self-sustained rated output of the PCS 131, the connection rated output of the solar cell 111, the self-sustained rated output of the solar cell 111, the connection rated output of the storage battery 112, the self-sustained rated output of the storage battery 112, and the like are included in the GET command or the GET response command. However, the embodiment is not limited to this. The PCS 131 may transmit an INF command including the above information elements. PCS 131 may transmit an INF command including the aforementioned information elements at the timing at which the power of the PCS 131 is turned on or turned on again, the timing at which the PCS 131 is connected or reconnected to the local area network, or the timing when the solar cell 111 or the storage battery 112 is connected or reconnected to the PCS 131. Alternatively, the PCS 131 may transmit an INF command including the aforementioned information elements at the timing when the operation state is switched from the connection operation state to the self-sustained operation state.

In an embodiment, the case where the predetermined protocol used in the communication between the EMS 160 and the equipment is the ECHONET Lite method has been described. However, the embodiment is not limited to this. The predetermined protocol may be a protocol standardized as a protocol used in the facility 100.

In an embodiment, the first distributed power source is the solar cell 111, and the second distributed power source is the storage battery 112. However, the embodiment is not limited to this. Both the first distributed power source and the second distributed power source may be the solar cell 111. Both the first distributed power source and the second distributed power source may be the storage battery 112. Either the first distributed power source or the second distributed power source may be the fuel cell 113.

This application claims the priority of Japanese Patent Application No. 2016-188856, filed on Sep. 27, 2016, the entire contents of which are hereby incorporated by reference.

The invention claimed is:

1. A power management method, comprising:
performing communication of a predetermined command using a predetermined protocol between a power conversion apparatus and a power management apparatus, the power conversion apparatus being connected to a first distributed power source and a second distributed power source which is of a different type than the first distributed power source, wherein, in a manner capable of identifying a connection rated output of one distributed power source of the first and second distributed power sources in a grid connection state and a self-sustained rated output of the one distributed power source in a self-sustained operation state, communication of a command including an information element designating at least one of the connection rated output of the one distributed power source and the self-sustained rated output of the one distributed power source is performed as the communication of the predetermined command; and
converting, by the power conversion apparatus, DC power from both of the first and second distributed power sources into AC power, wherein the power conversion apparatus operates differently when the one distributed power source is in the grid connection state than in the self-sustained operation state based on a difference between the connection rated output and the self-sustained rated output,
wherein the one distributed power source is a solar cell.

2. The power management method according to claim 1, wherein the information element of the command includes an information element designating a connection rated output of the first distributed power source in the grid connection state.

3. The power management method according to claim 2, wherein the command further includes an information element designating a connection rated output of the power conversion apparatus.

4. The power management method according to claim 1, wherein the information element of the command includes an information element designating a self-sustained rated output of the first distributed power source in the self-sustained operation state.

5. The power management method according to claim 4, wherein the command further includes an information element designating a self-sustained rated output of the power conversion apparatus.

6. The power management method according to claim 1, wherein the information element of the command includes an information element designating a connection rated output of the second distributed power source in the grid connection state.

7. The power management method according to claim 6, wherein the command further includes an information element designating a connection rated output of the power conversion apparatus.

8. The power management method according to claim 1, wherein the information element in the command includes an information element designating a self-sustained rated output of the second distributed power source in the self-sustained operation state.

9. The power management method according to claim 8, wherein the command further includes an information element designating a self-sustained rated output of the power conversion apparatus.

10. The power management method according to claim 1, further comprising:
inquiring about presence or absence of a function of performing communication of a command including an information element designating at least one of a connection rated output of the power conversion apparatus and a self-sustained rated output of the power conversion apparatus.

11. A power conversion apparatus connected to a first distributed power source and a second distributed power source which is of a different type than the first distributed power source, the power conversion apparatus comprising:
a power conversion unit configured to convert DC power from both of the first and second distributed power sources into AC power; and
a communication unit configured to perform communication of a predetermined command using a predetermined protocol with a power management apparatus, in an manner capable of identifying a connection rated output of one distributed power source of the first and second distributed power sources in a grid connection state and a self-sustained rated output of the one distributed power source in a self-sustained operation state, wherein communication of a command including an information element designating at least one of the connection rated output of the one distributed power source and the self-sustained rated output of the one distributed power source is performed as the communication of the predetermined command, wherein the power conversion apparatus configured to operate differently when the one distributed power source is in the grid connection state than in the self-sustained operation state based on a difference between the connection rated output and the self-sustained rated output, and wherein the one distributed power source is a solar cell.

12. A power management apparatus, comprising:

a communication unit configured to perform communication of a predetermined command using a predetermined protocol with a power conversion apparatus, the power conversion apparatus being connected to a first distributed power source and a second distributed power source which is of a different type than the first distributed power source, the power conversion apparatus converting DC power from both of the first and second distributed power sources into AC power;

wherein, in an manner capable of identifying a connection rated output of one distributed power source of the first and second distributed power sources in a grid connection state and a self-sustained rated output of the one distributed power source in a self-sustained operation state, communication of a command including an information element designating at least one of the connection rated output of the one distributed power source and the self-sustained rated output of the one distributed power source is performed as the communication of the predetermined command, wherein the power conversion apparatus is configured to operate differently when the one distributed power source is in the grid connection state than in the self-sustained operation state based on a difference between the connection rated output and the self-sustained rated output, and wherein the one distributed power source is a solar cell.

13. A power management system, comprising:

a power management apparatus; and a power conversion apparatus connected to a first distributed power source and a second distributed power source which is of a different type than the first distributed power source, the power conversion unit comprising:

a power conversion unit configured to convert DC power from both of the first and second distributed power sources into AC power, and a first communication unit configured to perform communication of a predetermined command using a predetermined protocol with the power management apparatus;

the power management apparatus comprising:

a second communication unit configured to perform communication of the predetermined command using the predetermined protocol with the power conversion apparatus;

wherein the first communication unit and the second communication unit are configured to perform, in an manner capable of identifying a connection rated output of one distributed power source of the first and second distributed power sources in a grid connection state and a self-sustained rated output of the one distributed power source in an self-sustained operation state, communication of a command including an information element designating at least one of the connection rated output of the one distributed power source and the self-sustained rated output of the one distributed power source, as the communication of the predetermined command, wherein the power conversion apparatus is configured to operate differently when the one distributed power source is in the grid connection state than in the self-sustained operation state based on a difference between the connection rated output and the self-sustained rated output, and wherein the one distributed power source is a solar cell.

14. The power management method according to claim 1, wherein one of the first and second distributed power sources is the solar cell or a storage battery.

15. The power management method according to claim 1, wherein one of the first and second distributed power sources is a storage battery.

* * * * *